Figure 1:
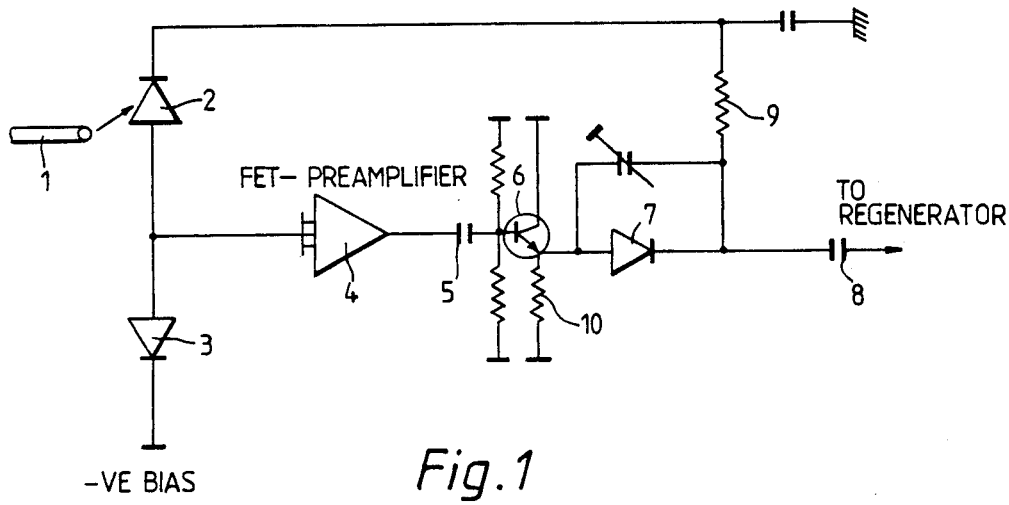

United States Patent [19]
Chown

[11] Patent Number: 4,498,197
[45] Date of Patent: Feb. 5, 1985

[54] OPTICAL RECEIVER

[75] Inventor: David P. M. Chown, Harlow, England

[73] Assignee: International Standard Electric Corporation, New York, N.Y.

[21] Appl. No.: 395,780

[22] Filed: Jul. 7, 1982

[30] Foreign Application Priority Data

Jul. 7, 1981 [GB] United Kingdom ............... 8120911

[51] Int. Cl.³ .............................................. H04B 9/00
[52] U.S. Cl. ................................ 455/619; 250/214 R; 307/311; 455/612
[58] Field of Search ............... 455/601, 606, 607, 612, 455/617, 619, 603, 608; 250/214 R, 214 A, 214 AG, 214 L, 214 DC, 214 C; 307/311

[56] References Cited
U.S. PATENT DOCUMENTS 4,238,648 12/1980 Epworth ............................ 250/551
4,249,264 2/1981 Crochet et al. .................... 455/617
4,399,565 8/1983 Jarret et al. ....................... 455/619

Primary Examiner—Joseph A. Orsino, Jr.
Attorney, Agent, or Firm—John T. O'Halloran; Robert P. Seitter

[57] ABSTRACT

An optical receiver for responding to optical energy propagating in an optical fibre transmissions path (1) is detected by a reverse-biassed p-i-n diode (2) which is in series with a forward-biassed p-i-n diode (3). The junction between the two diodes is connected to the input of an amplifier (4), which feeds on auto-equalizer.

The auto-equalizer includes another p-i-n diode (7) which is in series with the signal path, and is forward-biassed. Due to the associated components including resistors (9,10), the diode (7) passes the same average current as do the diodes (2,3) at the front end of the receiver. The overall effect of the third diode (7) is to provide the receiver with a substantial region in its characteristic whose frequency response is flat.

1 Claim, 2 Drawing Figures

FREQUENCY RESPONSES OF FRONT END AND
AUTO-EQUALIZERS USING PIN-DIODES

OPTICAL RECEIVER

This invention relates to an optical receiver, such as is used to terminate an optical fibre transmission line.

A known optical receiver uses a photo-diode, usually a p-i-n diode to receive the light incoming from an optical fibre transmission line. This diode, in response to the light incident on it from the line, generates a photo-current which flows in a load resistor in series with the diode. The junction of the diode and resistor is connected to the input of an amplifier. To make such an arrangement sensitive to the optical input, this series resistor must have a high value. However, if it does have such a high + value the dynamic range of the receiver is reduced.

To overcome this, the technique of our application Ser. No. 347,136, filed Feb. 9, 1982 (entitled Optical Receiver) now U.S. Pat. No. 4,473,745 is used. That application describes an optical receiver which includes a reverse-biassed p-i-n diode onto which light from the optical fibre link is directed, so that the diode generates a photo-current whose value depends on the magnitude of the incident optical power, a forward-biassed p-i-n diode connected in series with the reverse-biassed diode so that the photo-current flows in the forward-biassed diode, and an amplifier whose input is connected to the junction between the two diodes.

Such an arrangement provides a very wide dynamic range, but as the optical input power to such a receiver is increased, the resistance of the forward-biassed p-i-n diode fails, so that the receiver bandwidth increases. However, this is undesirable as it is usually considered desirable to be able to maintain a flat frequency response within the signal passband. An object of the invention is to enable the above difficulty to be minimised or overcome.

According to the invention, there is provided an optical receiver which includes means such as a photo-diode responsive to the reception of light from an optical fibre transmission link, an amplifier connected to the output of the photo-diode, and a p-i-n diode connected to the output of the amplifier and arranged to pass the output thereof, the resistance of the p-i-n diode being adapted to so vary as to compensate for variations in the input parameters of the receiver.

Thus it is visualized that the use of a p-i-n diode as a variable equalizer is not limited to use in conjunction with the optical receiver described and claimed in our above-quoted application.

According to the invention, there is provided an optical receiver for receiving optical energy from an optical fibre transmission link, which includes a reverse-biassed p-i-n diode onto which light from the optical fibre link is directed, so that the diode generates a photo-current whose value depends on the magnitude of the incident optical power, a forward-biassed p-i-n diode connected in series with the reverse-biassed diode so that the photo-current flows in the forward-biassed diode, an amplifier whose input is connected to the junction between the two diodes, and a third p-i-n diode connected to the output of the amplifier so as to pass the output of the amplifier, said third p-i-n diode being forward biassed and arranged to pass the same average current as do the first-mentioned p-i-n diodes.

Figure 2:
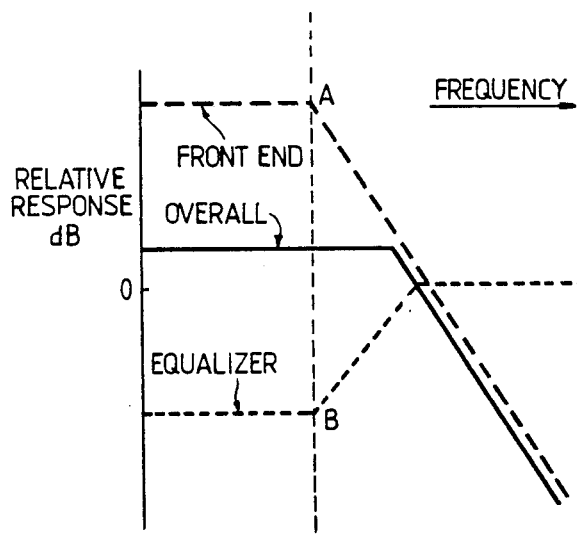

An embodiment of the invention will now be described with reference to the accompanying waveforms, in which FIG. 1 is a simplified circuit diagram of an optical receiver of the type described and claimed in our above-quoted application, and which embodies the present invention, and FIG. 2 is a graph useful in explaining the operation of the circuit of FIG. 1.

In FIG. 1, we have an optical fibre transmission link 1 "aimed" at a p-i-n photodiode 2, which is reverse-biassed. In series with this diode 2 there is a forward-biassed p-i-n diode 3. The junction between the diodes is connected to the input of an FET pre-amplifier 4 the output of which feeds the variable equaliser which is the essence of the present invention via a capacitor 5.

The diode 3 limits the voltage swing at the amplifier input, and at frequencies greater than 1/(minority carrier lifetime) its resistance is essentially linear and is inversely proportional to the average current flowing. Thus at high frequencies, e.g. above 10 Mb/s, it behaves like a load resistor whose value automatically falls as the received optical power increases. This prevents saturation at the receiver's input, and greatly extends the receiver's dynamic range. Such use of a p-i-n diode is made possible as a result of its very low self-capacitance at zero bias. It is in many cases possible to use the same diode type for diodes 2 and 3.

The above arrangement, as described and claimed in the above-quoted application, represents a major advance on the prior art, but it has the disadvantage that due to the fail in the resistance of the forward-biassed p-i-n diode, the receiver bandwidth increases. Where, as often happens, it is required for the receiver to have a flat frequency response, this is inconvenient, so in the present circuit a variable equaliser is provided to overcome this difficulty. It should be noted that the variable equaliser shown in the above-quoted application is for a quite different purpose—it is a feedback equaliser to compensate for variations in line losses.

In the present arrangement, FIG. 1, the equaliser includes an emitter-follower amplifier 6 which feeds a forward-biassed p-i-n diode 7 the output from which is applied via a capacitor 8 to an output to, for instance, a regenerator. The diode is biassed as shown and the components including the resistors 9 and 10 have their values so chosen that this p-i-n diode is forward-biassed and passes the same average current as do the two p-i-n diodes 2,3 at the input to the receiver. The resistances of the two forward-biassed p-i-n diodes in the complete receiver plus equaliser combination are thus virtually identical, so that the receiver automatically compensates for changes in the receiver's bandwidth.

The frequency responses of the receiver front end and of the equaliser are shown in FIG. 2 at A and B respectively, and it will be seen that the combined effect of the two is to give a substantially flat overall response over a relatively wide range.

I claim:

1. An optical receiver for receiving optical energy from an optical fibre transmission link, which includes a reverse-biassed p-i-n diode onto which light from the optical fibre link is directed, so that the diode generates a photo-current whose value depends on the magnitude of the incident optical power, a forward-biassed p-i-n diode connected in series with the reverse-biassed diode so that the photo-current flows in the forward-biassed diode, an amplifier whose input is connected to the junctions between the two diodes, and a third p-i-n diode connected to the output of the amplifier so as to pass the output of the amplifier, said third p-i-n diode being forward biassed and arranged to pass the same average current as do the first two-mentioned p-i-n diodes.

* * * * *